Sept. 9, 1958     E. L. KOLMORGEN ET AL     2,851,515

COMPRESSION RESISTANT ELECTRIC CABLE

Filed Dec. 19, 1955

INVENTOR
Edward L. Kolmorgen
Frederick M. Zinser, Jr.
BY
ATTORNEY

United States Patent Office 2,851,515
Patented Sept. 9, 1958

2,851,515
COMPRESSION RESISTANT ELECTRIC CABLE

Edward Lawrence Kolmorgen, Ossining, and Frederick M. Zinser, Jr., Dobbs Ferry, N. Y., assignors to Anaconda Wire and Cable Company, a corporation of Delaware Application December 19, 1955, Serial No. 553,958

4 Claims. (Cl. 174—117)

This invention relates to electrical cables. More particularly, it relates to electrical cables insulated with polyvinyl chloride, flame retardant polyethylene, or equivalent plastic material.

Cables formed of parallel extending conductors which are insulated with polyvinyl chloride or flame retardant polyethylene and then sheathed in polyvinyl chloride or flame retardant polyethylene are used for building wiring and for many other purposes. These cables have excellent electrical properties and weathering characteristics. However, they have low compressive strength and, hence, are not as safe as is desirable.

We have discovered that the compressive strength of such cable can be substantially increased by positioning between the insulation layer about each conductor and the overlying sheath a compression resistant film formed of a tough, horny synthetic resinous plastic material. Examples of materials which may be advantageously used to form the compression resistant film are nylon, i. e. long-chain linear superpolyamides, "Mylar" (which is the trade name of the E. I. du Pont Company of Wilmington, Delaware, for a plastic film composed essentially of highly polymeric long-chain polyesters of dicarboxylic acids and glycols), and polytetrafluoroethylene.

Accordingly, the present invention provides an electric cable having at least two conductors which extend along the cable in spaced parallel relation and which are each surrounded by an insulating layer of a plastic material selected from the group consisting of polyvinyl chloride and flame retardant polyethylene. Each of said insulating layers is surrounded by a compression resistant film applied directly over the outer surface thereof. The compression resistant films are composed essentially of a synthetic resinous plastic material selected from the group consisting of long-chain linear superpolyamides (nylon), highly polymeric long-chain polyesters of a dicarboxylic acid and a glycol, and a polytetrafluoroethylene. A protective covering or sheath formed of a plastic material selected from the group consisting of polyvinyl chloride and flame retardant polyethylene is applied directly over the compression resistant films on the insulated conductors and fills the space between them. The cable may also comprise a tension reinforcing member which, when used, advantageously is embedded in the protective sheath in one of the valley spaces between the insulated conductors.

In a presently preferred embodiment of the invention the compression resistant films are each formed of an extruded tubular layer of nylon. And in another preferred embodiment of the invention the compression reinforcing films are each formed of one or more helical or longitudinal wrappings of "Mylar" tape which is composed essentially of a highly polymeric long-chaing polyester of a dicarboxylic acid and a glycol.

The invention may be better understood by reference to the accompanying drawing, in which.

Figure 1:
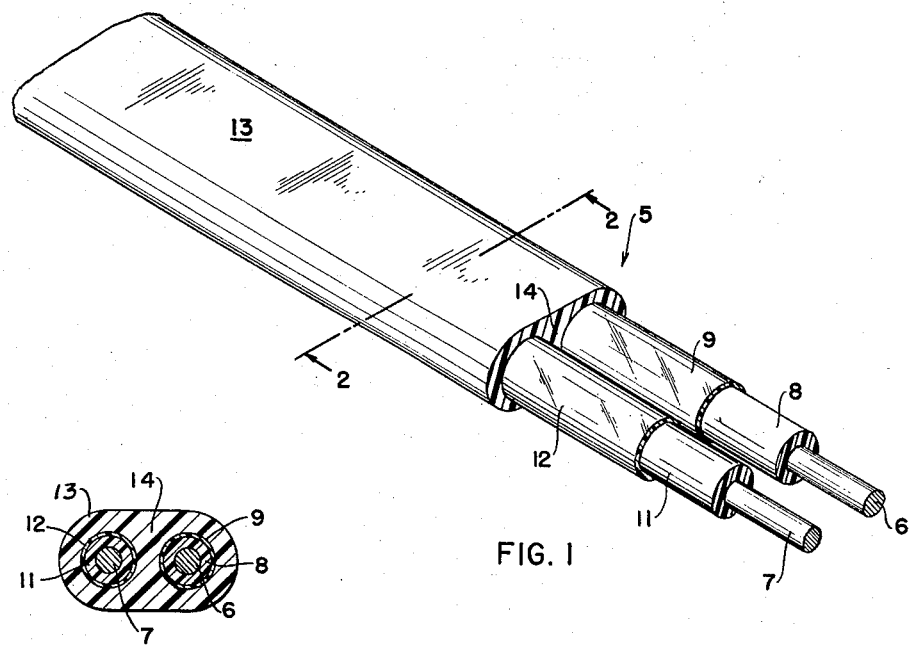
Fig. 1 is an isometric view of one form of cable according to the invention and having the compression resistant films formed of tubular layers of nylon.
Figure 2:
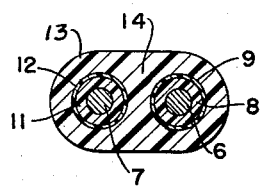
Fig. 2 is a cross section taken along line 2—2 of Fig. 1.

Referring to Fig. 1 and Fig. 2 of the drawing, an electric cable 5 has two conductors 6 and 7 extending in spaced parallel relation. The conductor 6 is surrounded by an insulating layer 8 formed of polyvinyl chloride or flame retardant polyethylene which has been extruded about the conductor. This insulating layer is in turn surrounded by a compression resistant film 9 which is applied directly over and completely surrounds the insulating layer 8. Similarly, the conductor 7 is surrounded by an insulating layer 11 formed of polyvinyl chloride or flame retardant polyethylene which has been extruded about the conductor, and this insulating layer is surrounded by a compression resistant film 12 which is applied directly over and completely surrounds the outer surface of the insulating layer 11.

The compression resistant films 9 and 12 are formed of nylon which has been extruded about the insulating layers of polyvinyl chloride. Hence, the compression resistant films form close-fitting seamless tubular coverings over the insulating layers. The thickness of the films may advantageously be in the range of from 2 to 10 mils.

An integral protective sheath 13 of polyvinyl chloride or flame retardant polyethylene is applied by extrusion directly over the compression resistant films. This protective sheath surrounds the insulated conductors and unites them into a cable, and it also forms a separator 14 which is integral with the jacket and extends between the insulated conductors.

Figure 4:
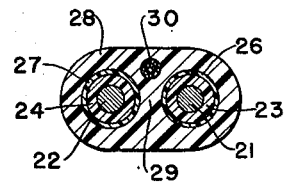
Fig. 4 is a cross section taken along line 4—4 of Fig. 3.
Figure 3:
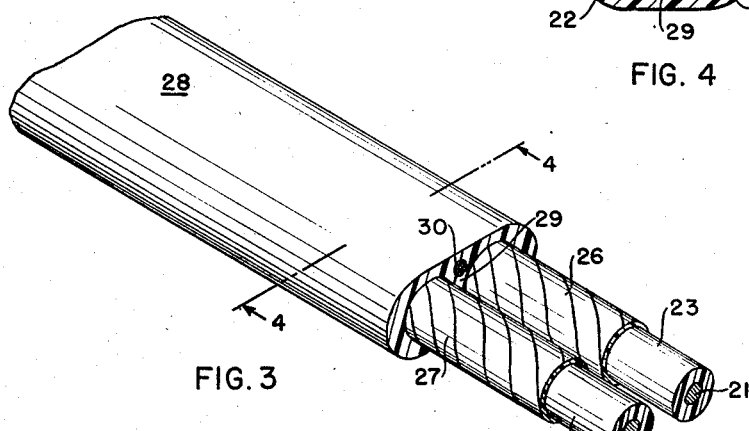
Fig. 3 is an isomeric view of an alternative form of cable according to the invention having the compression resistant films formed of a helical wrapping of "Mylar" tape.

Referring now to Fig. 3 and Fig. 4, there is shown in these figures a portion of a cable generally similar to the cable shown in Fig. 1 and Fig. 2, except that a helical wrapping of "Mylar" tape is used in place of the tubular layer of nylon which forms the compression resistant films of the cable shown in Figs. 1 and 2. The cable of Figs. 3 and 4 comprises conductors 21 and 22, insulating layers 23 and 24 of extruded polyvinyl chloride or flame retardant polyethylene, and compression resistant films 26 and 27. The tape which forms the compression resistant films may be applied with edges overlapping or abutting, as desired. A protective covering formed of polyvinyl chloride or flame retardant polyethylene is applied by extrusion directly over the tape wrapping and forms a sheath 28 which unites the insulating conductors into a cable. It also forms a separator 29 extending between the conductors which is integral with the jacket. A tension reinforcing member 30 is advantageously embedded in the separator, as shown. It is of course obvious that the tension reinforcing member may be incorporated or not, as desired, in either of the forms of cable shown in Figs. 1 to 4.

The compressive strength of a cable is a measure of the maximum load which may be applied transversely of the cable without causing the insulation to be ruptured. It is particularly important that the cable have high compressive strength to resist loads applied in an edgewise direction, so that the two conductors will not be short-circuited with each other. In the case of a two-conductor cable such as is shown in the accompanying drawings, the edgewise load (i. e. the load applied in the direction of a line perpendicular to the cable and passing through the axes of both conductors) which the cable will withstand is from 50% to 200% greater than the load which can be withstood by a cable of the same structure except that it does not have compression resistant films of the character specified. For example, whereas the compressive strength of a two-conductor cable for building wiring use, without the compression resistant films, is less than about 2,000 pounds, a cable of the same cross-sectional dimensions but having compression resisting films according to the invention has a compressive strength of more than 3,500 pounds.

In addition to having increased compressive strength, the cable of the invention has the advantage that the resistance to bending and the stresses set up within the polyvinyl chloride or polyethylene of the cable upon bending are much less than is the case with a cable of the same structure which does not have the compression resistant films. This feature is especially prominent when the cable of the invention is bent edgewise, i. e. about an axis perpendicular to a plane passing through both conductors. These bending characteristics of the cable of the invention are attributable to the fact that relative movement of each compression resistant film and the polyvinyl chloride or polyethylene contiguous thereto occurs when the cable is bent. While the compression resistant films of the cable fit closely about the insulating layers of the conductors and the protective covering in turn fits closely about the compression resistant films, the material of which these films are made is smooth and non-adherent to the polyvinyl chloride or polyethylene extruded adjacent to them, and they not only permit but actually facilitate free movement of the insulated conductors relative to the jacket when the cable is bent edgewise. Thus they enhance flexibility of the cable concomitantly with providing increased resistance to damage from compressive forces.

We claim:

1. An electric cable having at least two conductors extending along the cable in spaced parallel relation, each of said conductors being surrounded by an insulating layer of a plastic material selected from the group consisting of polyvinyl chloride and flame retardant polyethylene, and each of the insulating layers being surrounded by a compression resistant film applied directly over the outer surface thereof, the compression resistant films being substantially continuous and integral about the circumference of the insulated conductors and being composed essentially of a synthetic resinous plastic material selected from the group consisting of long-chain linear superpolyamides (nylon), highly polymeric long-chain polyesters of a dicarboxylic acid and a glycol, and polytetrafluoroethylene, and a protective covering of a plastic material selected from the group consisting of polyvinyl chloride and flame retardant polyethylene applied directly over the compression resistant films on said insulated conductors and filling the space between them.

2. An electric cable having at least two conductors extending along the cable in spaced parallel relation, each of said conductors being surrounded by an insulating layer of a plastic material selected from the group consisting of polyvinyl chloride and flame retardant polyethylene, and each of said insulating layers being surrounded by a compression resistant film applied directly over the outer surface thereof, the compression resistant films being substantially continuous and integral about the circumference of the insulated conductors and being composed essentially of a synthetic resinous plastic material selected from the group consisting of long-chain linear superpolyamides (nylon), highly polymeric long-chain polyesters of a dicarboxylic acid and a glycol, and polytetrafluoroethylene, a protective covering of a plastic material selected from the group consisting of polyvinyl chloride and flame retardant polyethylene applied directly over the compression resistant films, said protective covering forming a sheath which surrounds the insulated conductors and unites them into a cable and also forming a separator integral with said sheath extending between the insulated conductors, and a tension reinforcing member extending the length of the cable embedded in said protective covering.

3. An electric cable having at least two conductors extending along the cable in spaced parallel relation, an insulating layer of a plastic material selected from the group consisting of polyvinyl chloride and flame retardant polyethylene surrounding each conductor, a compression resistant film in the form of an extruded seamless tubular layer composed essentially of a long-chain linear superpolyamide (nylon) applied directly over the outer surface of each of said insulating layers, and a protective covering of a plastic material selected from the group consisting of polyvinyl chloride and flame retardant polyethylene applied directly over said extruded tubular nylon layers uniting the insulated conductors into a cable and filling the space between them.

4. An electric cable having at least two conductors extending along the cable in spaced parallel relation, an insulating layer of a plastic material selected from the group consisting of polyvinyl chloride and flame retardant polyethylene surrounding each conductor, a compression resistant film in the form of a wrapping of a tape composed essentially of a synthetic resinous plastic material selected from the group consisting of long-chain linear superpolyamides (nylon), highly polymeric long-chain polyesters of a dicarboxylic acid and a glycol, and polytetrafluoroethylene, applied directly over the outer surface of each of said insulating layers, said wrapping forming a substantially continuous and integral film about the circumference of the insulated conductors, and a protective covering of a plastic material selected from the group consisting of polyvinyl chloride and flame retardant polyethylene applied directly over and completely surrounding said tape wrappings and uniting the insulated conductors into a cable and substantially filling the space between them.

References Cited in the file of this patent

UNITED STATES PATENTS

| | | |
|---|---|---|
| 2,581,212 | Spooner | Jan. 1, 1952 |
| 2,624,777 | Abbott | Jan. 6, 1953 |
| 2,631,186 | Bondon | Mar. 10, 1953 |
| 2,663,755 | McBride | Dec. 22, 1953 |